US011085151B2

(12) United States Patent
Mustonen et al.

(10) Patent No.: US 11,085,151 B2
(45) Date of Patent: Aug. 10, 2021

(54) METHOD OF PRODUCING A FIBROUS WEB

(71) Applicant: Paptic Oy, Espoo (FI)

(72) Inventors: Tuomas Mustonen, Espoo (FI); Esa Torniainen, Espoo (FI); Karita Kinnunen-Raudaskoski, Espoo (FI); Marja Juvonen, Espoo (FI)

(73) Assignee: Paptic Oy, Espoo (FI)

( * ) Notice: Subject to any disclaimer, the term of this patent is extended or adjusted under 35 U.S.C. 154(b) by 187 days.

(21) Appl. No.: 16/304,181

(22) PCT Filed: May 23, 2017

(86) PCT No.: PCT/FI2017/050384
§ 371 (c)(1),
(2) Date: Nov. 23, 2018

(87) PCT Pub. No.: WO2017/203101
PCT Pub. Date: Nov. 30, 2017

(65) Prior Publication Data
US 2020/0283958 A1    Sep. 10, 2020

(30) Foreign Application Priority Data

May 23, 2016 (FI) ...................... 20165429

(51) Int. Cl.
| D21H 17/01 | (2006.01) |
| D21H 11/12 | (2006.01) |
| D21H 13/02 | (2006.01) |
| D21H 13/14 | (2006.01) |
| D21H 13/26 | (2006.01) |
| D21H 21/18 | (2006.01) |
| D21H 21/56 | (2006.01) |
| C08J 9/236 | (2006.01) |

(52) U.S. Cl.
CPC .............. *D21H 17/01* (2013.01); *C08J 9/236* (2013.01); *D21H 11/12* (2013.01); *D21H 13/02* (2013.01); *D21H 13/14* (2013.01); *D21H 13/26* (2013.01); *D21H 21/18* (2013.01); *D21H 21/56* (2013.01)

(58) Field of Classification Search
CPC ....... D21F 11/002; D21F 11/00; D21H 21/56; D21H 13/14; D21H 13/24; D21H 13/26; D21H 17/01; D21H 11/12; D21H 13/02; D21H 21/18; D21H 21/24; D04H 1/732; Y10T 442/689; Y10T 156/10; C08J 9/236
See application file for complete search history.

(56) References Cited

U.S. PATENT DOCUMENTS

| 4,443,297 A | * | 4/1984 | Cheshire | ............... D21F 11/002 162/101 |
| 5,178,729 A | * | 1/1993 | Janda | ..................... D21F 9/006 162/101 |
| 6,037,282 A | * | 3/2000 | Milding | ................ D21F 11/002 442/408 |
| 6,582,555 B2 | * | 6/2003 | Capizzi | .................. D21H 21/56 162/101 |
| 10,519,606 B2 | * | 12/2019 | Swails | .................... D21H 21/56 |
| 2011/0073239 A1 | * | 3/2011 | Manning | ................. B32B 27/12 156/62.2 |
| 2016/0221233 A1 | * | 8/2016 | Kiiskinen | ............. B29C 44/355 |
| 2019/0106842 A1 | * | 4/2019 | Kinnunen-Raudaskoski | ............. D21H 13/36 |
| 2019/0309480 A1 | * | 10/2019 | Luo | ....................... D21H 17/455 |
| 2020/0283958 A1 | * | 9/2020 | Mustonen | .............. D21H 21/18 |

FOREIGN PATENT DOCUMENTS

| EP | 0777782 B2 | * | 1/2003 | ............. D04H 1/732 |
| FI | 11142 A1 | | 2/2016 | |
| FI | 20146033 A | | 5/2016 | |
| JP | 08230371 A | * | 9/1996 | |
| SE | 503059 C2 | * | 3/1996 | ............. D21F 11/002 |
| WO | WO-9602701 A1 | * | 2/1996 | ............. D21F 11/002 |
| WO | WO-9606222 A1 | * | 2/1996 | ............. D04H 1/425 |
| WO | WO9606222 A1 | | 2/1996 | |
| WO | WO-9627044 A1 | * | 9/1996 | ............. D21H 25/04 |
| WO | WO9627044 A1 | | 9/1996 | |

OTHER PUBLICATIONS

Machine Translation of SE 503059 C2 (Year: 1996).*

* cited by examiner

*Primary Examiner* — Jose A Fortuna
(74) *Attorney, Agent, or Firm* — Laine IP Oy

(57) ABSTRACT

A method of producing a fibrous web, according to which method a fibrous web is formed of foamed fibre dispersion, by using foam forming. According to the present invention, the foamed fibre dispersion comprises recycled textile fibres and possibly natural fibres or synthetic fibres, or a mixture thereof, in which case, of the fibres in the fibre layer, at least 30% % by weight, in particular at least 50% by weight, is sourced from recycled textile fibres. The present invention generates a product with which it is possible to replace, for example, plastic in bag and package applications. The present product is also suitable, for example, for various textile and furniture applications.

21 Claims, No Drawings

METHOD OF PRODUCING A FIBROUS WEB

FIELD

The present invention concerns a method of producing a fibrous web.

According to a method such as this, a fibrous web is formed from a foamed fibre dispersion, by using foam forming technology.

The present invention also concerns a fibrous web and its use.

BACKGROUND

Environmental problems in the form of accumulations of plastics are widely known, among others, to occur in the sea and in birds. As a result, many companies are now restricting the use of plastics and many consumer product companies (brand owners) are seeking alternatives to plastics.

Bans to restrict the use of plastic bags is one major action. There are numerous alternatives to plastic bags, but all have significant problems associated with them.

For example, the raw materials of paper bags are ecological, but the material is much heavier than plastic and its performance regarding wet strength and tear resistance is lower. Bio-based plastics, again, do not solve the problem of accumulation because they do not break down in the environment. Also, the performance and the cost level of biodegradable plastics are not competitive. In addition, because many biodegradable plastics do not break down in the environment, they require an industrial biodegradation process.

SUMMARY OF THE INVENTION

It is an aim of the present invention is to eliminate the problems associated with the prior art and to provide a novel material which is suitable, for example, for the production of bags and other similar packaging and material applications.

The use of textile fibres for the production of absorbent material is described in the publication WO 96/06222. This publication presents a solution in which a fibrous web, which comprises fibres that contain recycled material, is hydroentangled in order to achieve a compact, absorbent material.

The present invention is based on the idea that a fibrous web which is produced by foaming can be achieved by using, as a raw material, 50-100% of textile fibres waste (fibre), possibly other reinforcing or additional fibres, as well as a binder (latex and the like). A fibrous web is produced which possesses advantageous properties for many applications.

The fibrous web obtained can be used, for example, in bags, packaging, furniture, textiles, technical textiles, garments and shoes, construction applications and bed linen.

Considerable advantages are achieved with the present invention. Examples of advantageous properties of the product are good tensile strength, tensile fracture, tear resistance and stretchability. Also, the settleability, evenness (good formation) and internal bond strength are adequate. By combining recycled textile fibres with synthetic fibres, a good seamability, too, is achieved for the products. Foam forming technology provides for a critical step, which is uniform dispersion of textile fibres in the wet-webbing process.

An easily available and inexpensive raw material can be used in the present invention to produce a plastic-like material. Previous technical solutions have attempted to use a textile waste flow as a filler, for example, in technical non-woven materials, generally the amounts added have been under 30% of the total weight of the material, and only in products having low-added value has the percentage has been higher. Examples of the latter products include absorption materials.

The use of recycled textile material as a raw material for new textiles has been proposed. In most cases, this only applies to homogeneous material streams, such as polyester fibres. Such a waste stream is typically an industrial secondary flow, which is generated prior to the product going to the consumers. However, the present novel technique allows for the utilisation of a heterogeneous recycled textile stream and, consequently, it is possible to use the present invention in cases where the separation of fibres is difficult when using the existing technique, or only one part of the raw material stream (for example, cotton) may be available.

In the present invention, the final product is formed by using foam forming, i.e. by directly drying a fibre layer which is applied onto the wire, without any mechanical processing step, such as hydroentangling.

In the present invention, good strength is achieved, but also other interesting properties, particularly when using a binder which, for example, is applied onto a fibrous web by using foam. By applying the binder onto the web, the binder can be dispersed into the web, whereby it binds the textile fibres together.

The present invention provides a product which, for example, can replace the plastic in bag and packaging applications. The product is also suitable for various textile and furniture applications. As a special feature, this technology enables responsibly acting companies to recycle waste, which is generated in their own production, to make products which are used in their own business. Examples of this are the utilisation by garment companies of recycled textiles for making bags (thus replacing plastic and cotton bags) and the utilisation of hotel chain bed linens for making bags for dirty laundry.

Another advantage of the present invention is that a closed loop/circular process solution is achieved for producing web-shaped products, in which case the waste stream is recycled into value-added products by resource-efficient processes.

EMBODIMENTS

In the following, the new technology will be examined in more detail with the help of preferred embodiments.

In one embodiment, the main raw material of the fibrous web which is being produced is textile fibre waste, in the present context also referred to as "recirculated textile fibre" or, correspondingly, "recycled textile fibre". Such heterogeneous fibre waste typically comprises a variable amount of natural fibres and synthetic fibres. According to the present invention, the heterogeneous recycled textile raw material is mixed with a foamed or foamable intermedium agent, after which from the foam thus generated, a dried fibrous web is formed by using foam forming.

In the present context, the recycled textile fibres are obtained, for example, from the industry as "pre-consumer recycled fibres". These fibres are waste fibres generated in industrial processes. In this case, the recycled fibres are, for example, waste from the production of consumer products and industrial fabrics, which have been collected before the products are used.

Recycled textile fibres can also be "post-consumer recycled fibres", which are obtained, for example, via garment collection.

Therefore, "recycled fibres" means the secondary flow or waste stream (i.e. fibre mixture) which is generated in the production process of both textiles and clothes, and also the textile waste which is collected from consumers.

In both cases, the textile fibres include fibres which are sourced from both natural materials and synthetic materials, in which case the recycled textile fibres are "heterogeneous" fibre materials: the fibres are sourced from different materials.

Typically, the present textile fibres include cellulose fibres, regenerated cellulose fibres, protein-based natural fibres or synthetic textile fibres or mixtures thereof, in which case the synthetic fibres are in particular polyolefin, polyester or polyamide fibres or mixtures thereof. Usually, the textile fibre waste that is used comprises cotton, wool, polyester and other fibres.

The average length of recycled textile fibres is 0.1 mm to 5 cm, in particular 0.1 to 3 cm.

The recycling of textile waste into garments is today carried out only using some special products. Most often, industrial secondary flows are used, not textile waste collected from consumers. As noted above, most of the recycled textile stream has ended up in absorbent mats and similar objects. A special problem is the heterogeneity of the raw material stream. And of particular concern is the lowest fraction of the textile secondary flow, in which the fibre length is less than 20 mm. This fraction cannot be used effectively in the production of textiles. Thus, in the past, the poorest quality fraction of the textile waste stream, i.e. the short-fibre fraction, has not been processed into value-added products, instead it has been destroyed by incineration or deposited in dumping grounds, which is prohibited, for example, in the EU. Therefore, the value of the textile secondary flow is low, approximately 50-200 euro/tonne.

In addition, previously, in the non-woven processes, it has only been possible to use "air-laid techniques", because the textile waste has been difficult to disperse into water processes. Due to the limitations of the air-laid techniques, product applications have also been limited. Moreover, it has not been possible to use textile fibre waste as a main raw material for web-like products, in particular in large-scale production processes.

In the material according to the present invention, the raw material used is the fibre flow which is generated in the recycling of textiles, including the above-mentioned fibre fraction, the size of which is less than 20 mm. In the process of recycling textiles, the essential stage is to break the fabric into fibres, which is typically carried out by mechanical tearing, or by dissolving the fabric directly to a molecular level, by using chemical technologies.

Because it is not possible to process the material into new textiles, the flow of excess material is of great interest from the point of view of the present technology.

The material according to the present invention is produced by using 50-100% of textile fibres and possibly other fibres, such as wood fibres (primary or recycled fibres), natural fibres or synthetic fibres, according to the application requirements of the material.

In one embodiment, a web, which comprises 50-100% by weight of textile fibres and 0-50% by weight of synthetic fibres, is prepared by using foam forming.

The grammage of the product to be produced is 20-500 $g/m^2$, in particular 50-200 $g/m^2$, most suitably 75-150 $g/m^2$.

In one embodiment, the raw material base of the fibre material is up to 100% recycled, in which case 30-100% of it is comprised of recycled textile waste, in which case the remainder is possibly comprised of other recycled fibres, such as PET fibres or recycled wood fibres. If necessary, primary fibres and other additives which adjust the material properties, are also used in the product.

In the foam forming process, the fibres are used by way of dispersing the fibres directly into the foam, or by first treating the fibres in a separate dispersing process, together with, for example, wetting/dispersing agents. Examples of dispersing and wetting agents include anionic surfactants and modified siloxanes, such as those sold under the trade names Tegopren and Rewopol.

The foam forming of fibres is described in our parallel FI Patent Application No. 20146033, which is herewith incorporated by reference.

Based on the above, the foam webbing is carried out, for example, in such a way that the fibres are dispersed directly into the foam, or by treating the fibres first in a separate dispersion process, possibly together with a binder for wetting agents, by combining the dispersion thus obtained with other fibres and foam generators, and by foaming the resulting mixture, after which the fibre-rich foam obtained is foam formed at a paper or cardboard machine, in order to produce a dried web.

In one embodiment, a foam is first formed by adding a foaming agent to an aqueous medium, which possibly comprises natural fibres or synthetic fibres or a mixture thereof; thereafter, a recycled textile fibre or part thereof is added, after which mixing of the foam is continued. Finally, in a way that is known per se, the obtained foam, which comprises recycled textile fibres, is foam formed.

In one application, a fibre mixture, which is to be foam formed, comprises, besides the textile fibres, up to 50% other fibres by weight. Examples of these are natural fibres such as wood fibres and other natural fibres, synthetic fibres and mixtures thereof.

Wood fibres are, for example, cellulose or lignocellulose fibres. In particular, the fibres are sourced from cellulose or lignocellulose raw materials, for example, by using chemical or semi-chemical pulping or defibring.

In general, the wood fibres, which are used in the present invention are plant-based fibres, and can be comprised of or be sourced from chemical pulp, such as sulphate or sulphite pulp, organosolv pulp, recycled fibres and mechanical pulp, which is produced, for example, by using refining or grinding. Examples of such masses are: refiner mechanical pulp (RMP) and pressurised refiner mechanical pulp (PRMP), pre-treatment refiner chemical alkaline peroxide mechanical pulp (P-RC APMP), thermomechanical pulp, (TMP), thermomechanical chemical pulp (TMCP), high-temperature TMP (HT-TMP), RTS-TMP, alkaline peroxide pulp (APP), alkaline peroxide mechanical pulp (APMP), alkaline peroxide thermomechanical pulp (APTMP), Thermopulp, groundwood pulp (GW), or stone groundwood, (SGW), pressurised groundwood pulp (PGW), as well as super pressure groundwood pulp, (PGW-S), thermogroundwood pulp, (TGW), or thermostone groundwood pulp (TSGW), chemimechanical pulp (CMP), chemi-refiner mechanical pulp (CRMP), chemithermomechanical pulp (CTMP), high-temperature chemithermomechanical pulp (HT-CTMP), sulphite-modified thermomechanical pulp (SMTMP), and reject CTMP, groundwood CTMP, semichemical pulp (SC), neutral sulphite, semi-chemical pulp (NSSC), high-yield sulphite pulp (HYS), biomechanical pulp (BRMP) and the pulps which are produced with the OPCO process, blasting-cooking process, Bi-Vis process, dilution water sulphonation process (DWS), sulphnonated long fibres process (SLF), chemically treated long fibres process (CTLF), long fibre CMP process (LFCMP), sulphate wood pulp, mdf fibres, nanocellulose, cellulose fibres having an average particle size of less than 1000 nm, and modificates and mixtures thereof.

The pulp can be bleached or unbleached. The pulp can be sourced from hardwood or softwood. Examples of wood species are birch, beech, aspen such as the European aspen, poplar, alder, eucalyptus, maple, acacia, mixed tropical hardwood, pine, American spruce, hemlock, larch, European spruce such as the Black Spruce or Norway Spruce, recycled fibre, as well as waste streams and secondary flows, which comprise fibres and which originate from the food industry or the wood and paper industry, as well as mixtures thereof.

The above-mentioned wood fibres can be primary or recycled fibres.

It is also possible to use raw materials which are neither wood nor wood-containing or derived from wood-based materials, such as seed hair fibres, leaf fibres, bast fibres. Plant fibres can be sourced from, for example, cereal crop straws, wheat straw, reed canary grass, reed, flax, hemp, kenaf, jute, ramie, sisal, abaca, seeds, coir, bamboo, bagasse, cotton kapok, milkweed, pineapple, cotton, rice, cane, esparto grass, *Phalaris arundinacea*, and combinations thereof. The above-mentioned natural fibres can be primary or recycled fibres.

In particular, the synthetic fibres are thermoplastic polymer fibres, such as polylactide, glycolic acid polymer, polyolefin, polyethylene terephthalate, polyester, polyamide, polyvinyl alcohol or bicomponent (bico) fibres. Examples of other fibres are regenerated cellulose fibres such as viscose, Lyocell, rayon, and Tencel fibres, and for example, carbon and glass fibres. Most suitably, polyolefin, polyester, polylactide or bico fibres or mixtures thereof, are used.

The above-mentioned synthetic fibres can be primary or recycled fibres.

As mentioned above, in the present invention, it is also possible to use mixtures of wood fibres, other natural fibres and synthetic fibres.

Typically, the length of natural fibres and synthetic fibres is 3-100 mm, for example 5-40 mm and preferably 5-20 mm. The fibre thickness (i.e. linear density) is typically 0.9-7 dtex, preferably 1.2-3.5 dtex.

In one embodiment, moreover, binder is applied onto the fibrous web, the solids percentage of the fibre layer being approximately 20-50%, in which case the binder is at least partially allowed to penetrate between the natural fibres.

In one application, the elongation of the dried fibrous web in the machine direction is more than 3%, in particular 5-30% and preferably 7-20%, and crosswise to the machine direction 3% or more, in particular 4.5-25%.

In one application, the elongation is over 4.5% both in the machine direction and crosswise to the machine direction.

In a preferred embodiment of the present solution, the fibrous web is kept coherent by using a binder, particularly by using merely a binder, and for example, hydroentangling is not used.

In one embodiment, the final product is formed directly by drying the fibre layer which is applied onto the wire.

Sufficient quantity of binder is applied onto the fibre such that the tensile strength of the dried fibrous web is more than 1 kN/m. The resulting elongation is most suitably more than 3%. In particular, the tensile strength is more than 2 kN/m and the elongation is 10-15%. Furthermore, by using a binder, it is possible to significantly improve the strength properties of the fibre layer.

The binder is typically a natural binder or a biopolymer, such as a starch or a modificate or derivative of starch, chitosan, alginate, or a synthetic binder, for example latex, such as vinyl acetate and acrylate latex, or polyurethane or SB latexes, polyvinyl alcohol or polyvinyl acetate, or a mixture or copolymer of these binders. In particular, for example, vinyl acetate or acrylate latex or a mixture thereof. Polyvinyl alcohol and polyvinyl acetate can also be used.

In one embodiment, sufficient quantity of binder is applied onto the fibre layer, for example, 5-40%, or 10-30% of the weight of the dried fibrous web, such that the tensile strength of the dried fibrous web, crosswise to the machine direction, is more than 1 kN/m and the elongation more than 3%.

In one embodiment, the binder is applied by using foam coating. Most suitably, sufficient quantity of binder is added such that its percentage of the weight of the dried fibrous web is 5-40%, preferably approximately 10-30%.

The penetration of the binder into the fibrous web can be promoted during or immediately after the application, by directing suction to the binder at the point where the coater is placed, from the opposite side of the fibrous web.

According to one embodiment, agents that are capable of modifying the properties of the fibrous web, such as synthetic fibres or plasticisers, are added into the binder.

Most suitably, additives which can improve the mechanical and thermal properties of the fibrous web, such as heat sealability or stretchability, are brought to the fibrous web.

The binder is brought to the web at such a point which is located between the wire and the drying sections of the paper machine. Furthermore, it is known that efforts have been made to promote the recycling of textiles in many ways.

The fibres are webbed to form a material and, if necessary, treated with a binder to improve the fibre bonds. Typically, the grammage of the finished product is 20-500 g/m², in particular 50-200 g/m², most suitably 75-150 g/m².

In one embodiment, the tensile strength of a web, which comprises only recycled textile fibres, is more than 1 kN/m, both in the machine direction and crosswise to the machine direction, the grammage of the web being approximately 50-75 g/m².

In one embodiment, the tensile strength is more than 2.5 kN/m both in the machine direction and in the crosswise to the machine direction, the grammage of the web being approximately 100-130 g/m², and the quantity of the recycled textile fibres being at least 70% by weight of the web fibres.

The material according to the present invention has a good elongation. Typically, the elongation is more than 3%, most suitably more than 5% and in particular more than 10%. The material has a good tear resistance, seamability and glueability, as well as a tensile strength which is sufficient for using the material.

The elongation values described above apply in particular to the elongation crosswise to the machine direction. Typically, the elongation in the machine direction is more than 50% better than crosswise to the machine direction.

The composition of the material renders it heat-sealable.

Based on the above, in one embodiment, a method is generated for producing a fibrous web, according to which method a fibrous web is formed of foamed fibre dispersion, by using foam forming, in which case the foamed fibre dispersion comprises recycled textile fibres and possibly natural fibres or synthetic fibres or mixtures thereof, in which case, of the fibres of the fibre layer, at least 30% by weight, in particular at least 50% by weight, for example 60-90% by weight, are sourced from recycled textile fibres.

Example 1. A Web Produced from a Recycled Textile Sample

The production of a product according to the present invention is based on foam forming, as it is described in FI Patent Application No. 20146033.

A sheet was formed by the foam forming of pulp and a recycled textile sample mixture, which comprises, among others, wool and viscose fibres, as follows:
- foaming agent was mixed with the pulp suspension for a period of three minutes,
- after which mixing time, wool or viscose was added into the pulp foam thus obtained, after which the mixing was continued for a period of another 0.5 minutes, and
- the fibre foam was poured onto the wire and the water was removed under reduced pressure, a sufficient quantity of binder being applied onto the formed sheet such that the tensile strength of the dried fibrous web was more than 1 kN/m and the elongation was more than 3%, in particular more than 5%.

In one embodiment, the elongation was more than 3%, in particular more than 5%, both in the machine direction and crosswise to the machine direction.

In one embodiment, the tensile strength was more than 1 kN/m, both in the machine direction and crosswise to the machine direction.

In one application, additives were brought to the fibrous web in order to improve the mechanical and thermal properties of the fibrous web, such as heat sealability or stretchability. The fibrous web was dried at room temperature. Alternatively, to prevent sheet shrinkage, it can be dried between a metal plate and a fabric.

The dried sheet was treated with a binder dispersion and thereafter dried in an oven for a period of 10 minutes. The sheets were calendered by using a metal belt pilot calender.

The final base weight of the sheets were 60-70 g/m².

The raw materials, tensile strength and breaking elongation are shown in Table 1 (recycled textile).

TABLE 1

Raw materials, tensile strength and elasticity (recycled textile) Calendered sheets

| Test point | Pulp, % | Recycled textile, % | Binder, % | MD/CD | Tensile strength, kN/m | Breaking elongation, % |
|---|---|---|---|---|---|---|
| Recycled textile, 20% | 46 | 20 | 34 | MD | 1.91 | 3.49 |
| | | | | CD | 1.46 | 8.51 |
| Recycled textile, 34% | 33 | 33 | 34 | MD | 1.14 | 2.77 |
| | | | | CD | 1.18 | 7.49 |
| Recycled textile, 24% | 56 | 24 | 20 | MD | 3.1 | 4.45 |
| | | | | CD | 1.68 | 6.41 |

Example 2. Physical Properties of Recycled Textile Fibre Sheets which are Formed from Foam Cotton-containing recycled textile fibres and PLA fibres were foam formed by using a laboratory-scale foam webber, and the obtained web was coated with a binder dispersion, under low pressure conditions. The linear density of the PLA fibres was 1.5 dtex and the lengths of the fibres were 6 and, correspondingly, 12 mm. The grammage of the formed sheets was 111-120 g/m². The amount of binder in the final sheet was 20-25%.

Tensile strength of the foam formed laboratory sheets are shown in Table 2. The determinations were carried out at a relative humidity (RH) of 31% and a temperature of 22° C.

TABLE 2

Tensile strengths of the foam formed laboratory sheets

| | Measurement direction* | Number of measurements | 100% cotton waste | 70% cotton waste, 30% PLA 6 mm, 1.5 dtex |
|---|---|---|---|---|
| Grammage, g/m² | | | 120 | 120 |
| Maximum force, N | MD | 5 | 49.9 | 55.6 |
| Maximum force, N | CD | 5 | 27.0 | 38.8 |
| Tensile strength, kN/m | MD | 5 | 3.33 | 3.71 |
| Tensile strength, kN/m | CD | 5 | 1.8 | 2.59 |
| Tensile index, Nm/g | MD | 5 | 27.8 | 30.9 |
| Tensile index, Nm/g | CD | 5 | 15.0 | 21.6 |
| Elongation, % | MD | 5 | 4.92 | 6.61 |
| Elongation, % | CD | 5 | 3.42 | 4.98 |
| Tensile energy absorption, J/m² | MD | 5 | 101.52 | 161.23 |
| Tensile energy absorption, J/m² | CD | 5 | 39.89 | 85.01 |
| Tensile energy absorption index, J/g | MD | 5 | 0.846 | 1.34 |
| Tensile energy absorption index, J/g | CD | 5 | 0.332 | 0.708 |
| Modulus of elasticity, kN/m | MD | 5 | 142.4 | 131.3 |
| Modulus of elasticity, kN/m | CD | 5 | 98.4 | 111.8 |
| Tensile stiffness index, kNm/g | MD | 5 | 1.19 | 1.09 |
| Tensile stiffness index, kNm/g | CD | 5 | 0.820 | 0.932 |

*MD = in the machine direction, CD = crosswise to the machine direction

The tear resistance values are shown in Table 3. The measurements were carried out according to standard ISO 1974:2012, at a relative humidity (RH) of 50% and at a temperature of 23° C.

TABLE 3

Tear resistance values are determined from laboratory sheets which are produced by using foam forming.

| | Measurent direction* | Number of measurements; 2 pcs per stack | 100% cotton waste | 70% cotton waste, 30% PLA 6 mm, 1.5 dtex | 70% cotton waste, 30% PLA 12 mm, 1.5 dtex |
|---|---|---|---|---|---|
| Grammage, g/m² | | | 111 | 116 | 120 |
| Tear resistance, mN | MD | 5 | 2605 | 4288 | 5991 |
| Tear resistance, mN | CD | 5 | 3229 | 4830 | 6485 |
| Tear index, mNm²/g | MD | 5 | 23.4 | 36.9 | 49.9 |

TABLE 3-continued

Tear resistance values are determined from laboratory sheets which are produced by using foam forming.

| | Measurent direction* | Number of measurements; 2 pcs per stack | 100% cotton waste | 70% cotton waste, 30% PLA 6 mm, 1.5 dtex | 70% cotton waste, 30% PLA 12 mm, 1.5 dtex |
|---|---|---|---|---|---|
| Tear index, mNm²/g | CD | 5 | 29.0 | 41.6 | 54.0 |

*MD = in the machine direction, CD = crosswise to the machine direction

CITATIONS LIST

Patent Literature

WO 96/06222
FI 20146033

The invention claimed is:

1. A method of producing fibrous web, comprising:
   forming a fibrous web from a foamed fibre dispersion by using foam forming, wherein
   the foamed fibre dispersion comprises recycled textile fibres and optionally fibres selected from the group consisting of natural fibres, synthetic fibres and a mixture thereof, at least 50% by weight of the fibres in the fibre web being sourced from the recycled textile fibres; and
   applying a binder onto the foam-formed fibrous web in an amount effective to provide the foam-formed fibrous web, upon drying, with a tensile strength of the more than 1 kN/m, measured crosswise to the machine direction, and with an elongation of more than 3% measured in the machine direction.

2. The method according to claim 1, wherein the aqueous dispersion to be foamed is formed of heterogeneous recycled textile fibres and optionally homogeneous natural fibres, homogeneous synthetic fibres or a mixture thereof.

3. The method according to claim 1, wherein a web is produced, which comprises 50-100% by weight of textile fibres, optionally together with virgin-natural fibres, and 0-50% by weight of synthetic fibres.

4. The method according to claim 1, wherein the foam forming is carried out by dispersing the fibres directly into the foam, which optionally comprises other fibres, or by treating the fibres first in a separate dispersing process, optionally together with a binder for wetting agents, by then combining with the dispersion thus obtained other fibres and foam generators, and by then foaming the mixture thus obtained, after which a fibrous web is formed from the foam.

5. The method according to claim 4, wherein the wetting agents used to disperse the recycled textile fibres into an aqueous medium are anionic surfactants or modified siloxanes.

6. The method according to claim 1, wherein the recycled textile fibres comprise a fibre mixture which is obtained from a member selected from the group consisting of a secondary flow or waste stream generated in the production process of textiles or clothes, textile waste which is collected from consumers, and a mixture thereof.

7. The method according to claim 1, wherein the grammage of the product to be produced is 20-500 g/m².

8. The method according to claim 1, wherein the binder is applied onto the fibrous web when the solids content of the fibre layer is approximately 20-50%, in which case the binder is allowed at least partially to penetrate into the fibre matrix.

9. The method according to claim 8, wherein the elongation is from 5-30% measured in the machine direction.

10. The method according to claim 8, wherein the binder is applied by using foam coating.

11. The method according to claim 8, wherein a sufficient quantity of binder is added such that its percentage of the weight of the dried fibrous web is 5-40%.

12. The method according to claim 8, wherein the penetration of the binder into the fibrous web, during the application or immediately after, is facilitated by directing suction to the binder from the opposite side of the fibrous web to which the binder is applied.

13. The method according to claim 1, wherein agents which are capable of modifying the properties of the fibrous web are added into the binder.

14. The method according to claim 1, wherein additives which can improve the mechanical and thermal properties of the fibrous web are brought to the fibrous web.

15. The method according to claim 1, wherein the textile fibres comprise fibres selected from the group consisting of cellulose fibres, regenerated cellulose fibres, protein-based natural fibres, synthetic fibres, and mixtures thereof.

16. The method according to claim 1, wherein the natural fibres are cellulose or lignocellulose fibres.

17. The method according to claim 1, wherein the natural fibres are plant fibres.

18. The method according to claim 1, wherein the synthetic fibres are thermoplastic polymer fibres.

19. The method according to claim 1, wherein the binder is selected from the group consisting of a natural binder, a biopolymer, a synthetic binder and a mixture or copolymer of these binders.

20. The method according to claim 1, wherein the binder is brought to the web at such a point which is located between wire and drying sections of a paper machine.

21. The method according to claim 1, wherein the forming is done without hydroentangling the foamed fiber dispersion.

* * * * *